US008584027B2

(12) United States Patent
Quennesson et al.

(10) Patent No.: US 8,584,027 B2
(45) Date of Patent: Nov. 12, 2013

(54) FRAMEWORK FOR DESIGNING PHYSICS-BASED GRAPHICAL USER INTERFACE

(75) Inventors: Kevin Quennesson, San Francisco, CA (US); Alessandro Sabatelli, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 535 days.

(21) Appl. No.: 12/476,998

(22) Filed: Jun. 2, 2009

(65) Prior Publication Data

US 2010/0306680 A1 Dec. 2, 2010

(51) Int. Cl.
*G06F 3/048* (2013.01)
*G06F 3/01* (2006.01)

(52) U.S. Cl.
USPC ........... 715/763; 715/863; 715/800; 715/701; 345/619; 345/473; 345/475

(58) Field of Classification Search
USPC .......................... 715/763; 345/619, 473–475
See application file for complete search history.

(56) References Cited

U.S. PATENT DOCUMENTS

| | | | |
|---|---|---|---|
| 6,069,629 A | 5/2000 | Paterson et al. | |
| 6,282,699 B1 | 8/2001 | Zhang et al. | |
| 6,594,822 B1 | 7/2003 | Schweitz et al. | |
| 7,039,866 B1 * | 5/2006 | Rosenberg et al. | 715/701 |
| 7,058,896 B2 | 6/2006 | Hughes | |
| 7,536,676 B2 | 5/2009 | Baker et al. | |
| 2003/0061399 A1 | 3/2003 | Wagener et al. | |
| 2003/0103083 A1 | 6/2003 | Denny et al. | |
| 2003/0218628 A1 | 11/2003 | Deshpande et al. | |
| 2004/0117333 A1 * | 6/2004 | Voudouris et al. | 706/13 |
| 2004/0138824 A1 | 7/2004 | Da et al. | |
| 2004/0250236 A1 | 12/2004 | O'Malley et al. | |
| 2005/0065913 A1 | 3/2005 | Lillie et al. | |
| 2005/0086344 A1 | 4/2005 | Suesserman | |
| 2005/0108384 A1 | 5/2005 | Lambert et al. | |
| 2005/0188259 A1 | 8/2005 | Zweifel | |
| 2005/0243346 A1 | 11/2005 | Foehr et al. | |
| 2006/0038811 A1 | 2/2006 | Owens et al. | |
| 2006/0064685 A1 | 3/2006 | DeFolo | |
| 2006/0121436 A1 | 6/2006 | Kruse et al. | |

(Continued)

OTHER PUBLICATIONS

WorkingWithQuartzComposer, Apple Computer Inc, Oct. 30, 2008, 10 pages.*

(Continued)

*Primary Examiner* — Ramsey Refai
*Assistant Examiner* — Toan Vu
(74) *Attorney, Agent, or Firm* — Blakely, Sokoloff, Taylor & Zafman LLP

(57) ABSTRACT

A graphics development framework for designing physics-based graphical user interfaces is described herein. According to one embodiment, visually linkable patches are displayed in a first window of a graphics development framework, where the patches represent a graphics composition which when rendered, animate a physical movement of a graphics object of the physics-based GUI. A feedback patch is displayed to visually provide a feedback from an output of the composition to an input of the composition, such that a subsequent physical movement of the graphics object is determined based on a previous physical movement of the graphics object, without requiring a user to program source code of the displayed patches. A result of rendering is instantly displayed in a second window of the graphics development framework, simulating the physical movement of the graphical object. Other methods and apparatuses are also described.

15 Claims, 11 Drawing Sheets

FIG. 2

(56) References Cited

U.S. PATENT DOCUMENTS

| | | | |
|---|---|---|---|
| 2007/0018980 A1* | 1/2007 | Berteig et al. | 345/426 |
| 2007/0060337 A1* | 3/2007 | Abe | 463/30 |
| 2007/0124322 A1 | 5/2007 | Meyer et al. | |
| 2007/0129916 A1 | 6/2007 | Muller et al. | |
| 2007/0153004 A1* | 7/2007 | Airey et al. | 345/473 |
| 2007/0162853 A1 | 7/2007 | Weber et al. | |
| 2007/0182747 A1 | 8/2007 | Harper et al. | |
| 2007/0236509 A1 | 10/2007 | Eldridge et al. | |
| 2008/0028918 A1* | 2/2008 | Latour | 84/610 |
| 2008/0030504 A1* | 2/2008 | Brunner et al. | 345/473 |
| 2008/0034292 A1 | 2/2008 | Brunner et al. | |
| 2008/0103786 A1 | 5/2008 | Zhang et al. | |
| 2008/0104143 A1 | 5/2008 | Khor et al. | |
| 2008/0158148 A1 | 7/2008 | Madonna et al. | |
| 2008/0168384 A1 | 7/2008 | Platzer et al. | |
| 2008/0303839 A1 | 12/2008 | Quennesson et al. | |
| 2008/0304770 A1 | 12/2008 | Latour et al. | |
| 2008/0307307 A1 | 12/2008 | Ciudad et al. | |
| 2009/0259450 A1 | 10/2009 | Cleary et al. | |
| 2009/0271309 A1 | 10/2009 | Gordon et al. | |
| 2010/0122243 A1 | 5/2010 | Breton et al. | |

OTHER PUBLICATIONS

"Quartz Composer Programming Guide," Apple Inc., Cupertino, California, Oct. 15, 2008, 32 pages.

"Working with Quartz Composer," Apple Inc., Cupertino, California, Developer Connection, Oct. 30, 2008, 10 pages.

Sadun, Erica "Getting Started with Quartz Composer," O'Reilly Media, Inc., MacDevCenter, http://www.macdevcenter.com/pub/a/mac/2006/03/23/quartz-composer.html, Mar. 23, 2006, 11 pages.

* cited by examiner

FRAMEWORK FOR DESIGNING PHYSICS-BASED GRAPHICAL USER INTERFACE

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to graphical user interface designs. More particularly, this invention relates to a framework for designing physics-based graphical user interface.

BACKGROUND

It is known in the art of computer graphics to create motion graphics programs called "compositions." Compositions are a relatively simple way in which a user can intuitively create motion graphical effects (such as a moving background, flashing text, etc.) without extensive knowledge of how to program a computer. An exemplary program that allows for the creation of composition files is known as the Quartz Composer™, available from Apple Inc.

Quartz Composer is based on and brings together several graphical and non-graphical technologies, such as Quartz 2D, Core Image, Core Video, OpenGL, QuickTime, MIDI System Services, and Real Simple Syndication. As a result, once created, compositions can be incorporated into any number of applications, such as iPhoto, iMove, iChat, etc.

When creating a composition file, the editor portion of the Quartz Composer program contains a grid for assembling and connecting "patches", which are selected from a library. Patches are like functions, and may take input parameters (the left side of the patches) and provide output results (the right side of the patches). Within the editor, patches can be visually connected together by links to create a composition which essentially defines the data flow or the manner in which graphical motion data is processed by the composition. A benefit of the Quartz Composer format is the ease with which a user can quickly create a relatively complicated graphical composition.

In addition, physics systems are of growing importance for user interfaces, such as the well-known swipe or scrolling with inertia and bounce features from the iPhone™ of Apple Inc. Physics-based user interfaces (UIs) provide a more fluid and natural way for users to interact with computer systems. However, such systems as they try to model more advanced behaviors (such as spring systems), are difficult to design for non-specialists and are out of reach of ordinary designers. There has been a lack of user-friendly graphics design framework for designing physics-based graphical user interfaces (GUIs).

SUMMARY OF THE DESCRIPTION

A graphics development framework for designing physics-based graphical user interfaces is described herein. A graphics development framework for designing physics-based graphical user interfaces is described herein. According to one embodiment, visually linkable patches are displayed in a first window of a graphics development framework, where the patches represent a graphics composition as a part of a physics-based graphical user interface (GUI) which when rendered, animates a physical behavior of a graphics object of the physics-based GUI. A feedback patch is displayed to visually provide a feedback from an output of the composition to an input of the composition, such that a subsequent physical movement of the graphics object is determined based on a previous physical movement of the graphics object, without requiring a user to program source code of the displayed patches. A result of rendering is instantly displayed in a second window of the graphics development framework, simulating the physical behavior of the graphical object.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

A graphics development framework for designing physics-based graphical user interfaces is described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, graphical functional blocks, also referred to herein as patches, are utilized to encapsulate functionalities (e.g., programmable operations and/or associated source code) of certain operations, including numeric or graphics operations, for designing and rendering physics-based user interfaces. Specifically according to one embodiment, a feedback patch is designed to provide a feedback loop. A composition can be constructed in hierarchical graphs having multiple levels. Each level within this hierarchy can have published inputs and outputs which are then exposed at a level above. These exposed ports form an interface for a given level. A feedback patch dynamically creates initial state input and output ports for all published ports at a given level in the hierarchy representing the values of the published output ports at a shifted time (e.g., t−dt). A user can drag and drop a feedback patch into the composition displayed in an editing window of a graphics development framework. Effectively, a user can pile up effects, such as, for example, springs, inertia, attractors, bounce, etc., within a feedback loop using a feedback patch and a patch to render a result at the current time to design and tune the behavior of physics-based interactions.

For example, in the equation of $$F(t)=F(t-dt)+dt*dF/dt+o(t)$$

The feedback patch corresponds to F(t−dt). Users interactively design dF/dt and F(t) is rendered and drawn on the screen for all t. The feedback patch can return simple numbers, images, or buffers, etc. Thus, such a framework can also be used to simulate more advanced simulations such as cloth, shallow water, 2D and volumetric smoke, fire, and clouds, etc. As a result, an abstraction is created between a designer and a programmer, such that an ordinary graphics designer can use the graphics development framework to design and fine tune the physical behavior of the user interface without having to know the programming aspect of the physics-based user interface designs.

Figure 1:
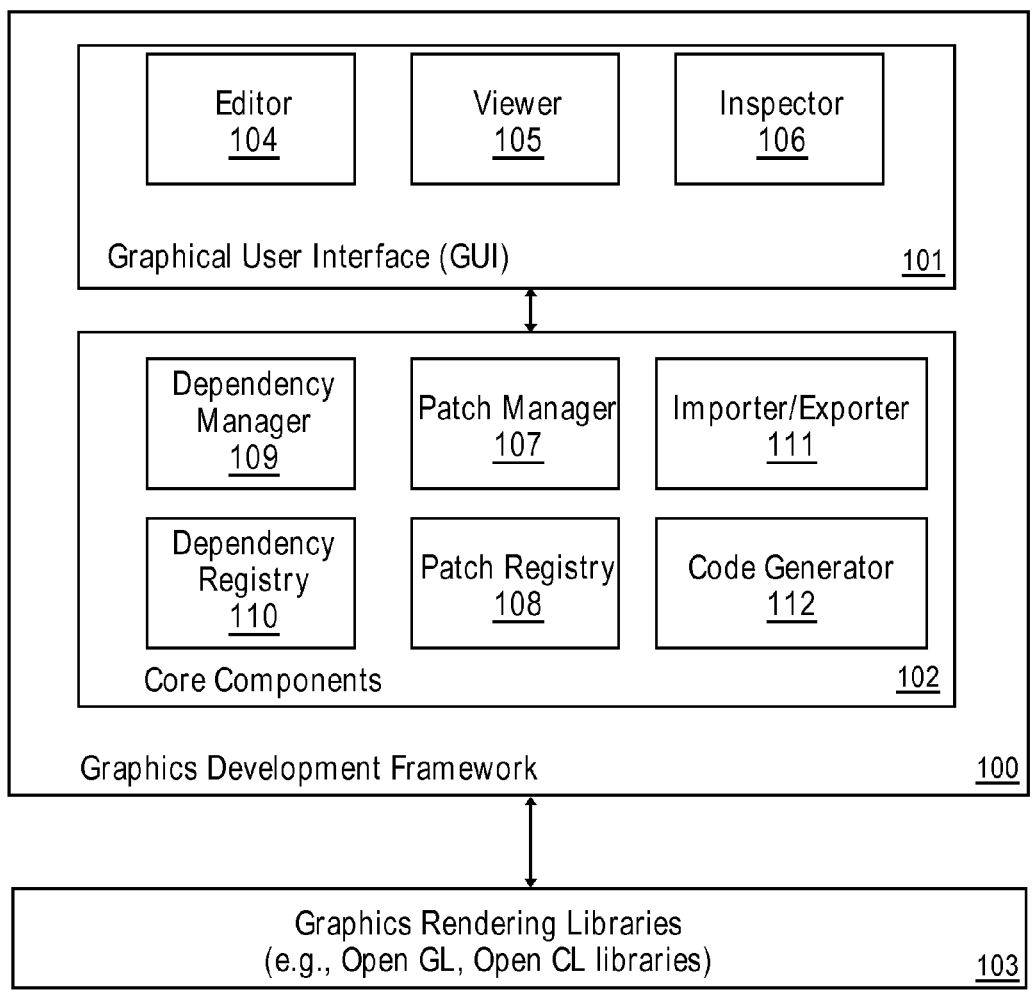
FIG. 1 is a block diagram illustrating graphics development framework architecture according to one embodiment.

FIG. 1 is a block diagram illustrating graphics development framework architecture according to one embodiment. Referring to FIG. 1, the system architecture includes graphics development framework 100 communicatively coupled to a set of graphics rendering libraries 103, such as, for example, OpenGL or OpenCL core libraries, which may take advantage of certain graphics rendering hardware such as a CPU (central processing unit) and/or a GPU (graphics processing unit), etc.

Graphics development framework 100 includes a GUI component 101 and core components 102. GUI 101 includes an editor 104, a viewer 105, and an inspector 106. Editor 104 is configured to allow a user to visually edit or connect patches of a composition. Viewer 105 is configured to instantly display or render the composition currently being edited in editor 104. Inspector 106 is configured to allow a user to display and edit internal settings or parameters of the composition or patches currently being edited.

Graphics development framework 100 provides a higher level development environment to users using an approachable visual programming paradigm. Instead of writing pages worth of code to directly manipulate the various graphics APIs (of graphics rendering libraries 103), a user can work visually with processing units called patches via editor 104. These patches are connected into composition. As a user works with a composition, adding patches and connecting them, a user can visually see the results in viewer 105. Each and every change a user makes is immediately reflected in viewer 105 and no compilation is required.

A patch is similar to a subroutine in a traditional programming environment. A patch has an interface where data can enter or exit. Such an interface is also referred to as a port. A link connecting two patches represents an underlying API between two functions or subroutines represented by the patches. A patch can contain another patch. Such a patch is also referred to as a macro patch. A user can encapsulate one or more patches in a macro patch and make it more usable. From viewer 104, a user can select and enter a macro patch and all its sub-patches are displayed. The parent patch and the siblings to the parent patch may be hidden, allowing the user to focus on the sub-function that the macro performs. A virtual macro is an external reference to a macro. In this way, a user can share some functionality or reference it inside their composition without having to duplicate the primitives that the macro contains.

Note that a patch is a very abstract concept. A patch can represent some JavaScript code or some OpenCL or CoreImage/GLSL kernel. This maps then very well for a web environment. For instance, in the case of Web applications, lots of JavaScript source and related modules/libraries/"functional blocks" are downloaded to run a Web application, and the code is then optimized and compiled (Just-In-Time compiler or JIT) to run faster on a client machine. Assuming that now some modules were present on the client already as virtual macros, we could significantly reduce launch time of the application by using the ones already compiled locally on the client. This works also for other languages, such as C, C++, OpenCL, etc.

In an OpenCL environment, whenever an OpenCL kernel is opened through an OpenCL kernel patch, to compile the kernel on the current GPU (graphics processing unit) and save the compiled binary within the OpenCL patch. Typically, the compilation is relatively expensive for OpenCL. According to one embodiment, the next time the OpenCL kernel patch is loaded and if the GPU is the same, we can just select the binary, send it to the GPU and skip compilation. This will tremendously reduce the loading time.

Referring back to FIG. 1, in one embodiment, core components 102 includes a patch manager 107 for managing patches stored in a patch registry 108. The patches may be organized in one or more libraries as part of patch registry 108. Core components 102 further includes a dependency manager 109 for managing dependency relationships of patches, which are stored in the dependency registry 110. As described above, a patch may include one or more sub-patches and thus, a patch of a composition may depend from another patch. The dependency relationship information stored in dependency registry 110 may be used by an import/export module 111 and code generator 112 for exporting certain patches to be shared with another user.

According to one embodiment, in response to a user request for exporting a selected patch, the dependency manager 109 retrieves the dependency relationship information from dependency registry 110 or alternatively, dynamically performs a dependency analysis. Based on the dependency analysis, code generator unit 112 extracts the source code associated with the patch being exported, including any source code of other patches having a dependency relationship with the patch being exported. In one embodiment, only the source code associated with the exported patches are extracted. Source code associated with a patch that is not selected and has no dependency relationship with the selected patch is not extracted.

For example, if a composition currently displayed on editor 104 includes three patches: A-B-C. If a user selects patches B and C only for export, source code associated with patches B and C are extracted without including source code of patch A. In addition, if patch C depends from patch D (based on a dependency analysis performed by dependency manager 109), the source code associated with patch D may also be extracted.

The selected patch and the generated source code are packaged and saved as a composition file, which may be organized in one or more libraries as part of patch registry 108. A composition file is created through the connection (e.g., dependency relationship) of patches in a composition editor 104. Once saved to a library, a composition file is assigned with a unique identifier, for example, in a form of unique text string. This allows the composition file to be reliably and persistently identified independent of the client application or of the computer. The identifier may remain identical even if the composition file is moved to a new location within the repository, or installed in a repository of another computer.

In addition, according to one embodiment, patch registry 108 further includes a feedback patch is designed to provide a feedback loop from an output of a composition (e.g., a patch designated as an output patch) to an input of the composition (e.g., a patch designated as an input patch). A user can drag and drop a feedback patch into the composition displayed in an editing window of a graphics development framework. Effectively, it can pile up effects, such as, for example, springs, inertia, attractors, bounce, etc., within a feedback patch and another rendering patch for rendering a result at the current time to design and tune the behavior of physics-based interactions. Note that some or all of the components as shown in FIG. 1 may be implemented in software, hardware, or a combination of both.

Figure 2:
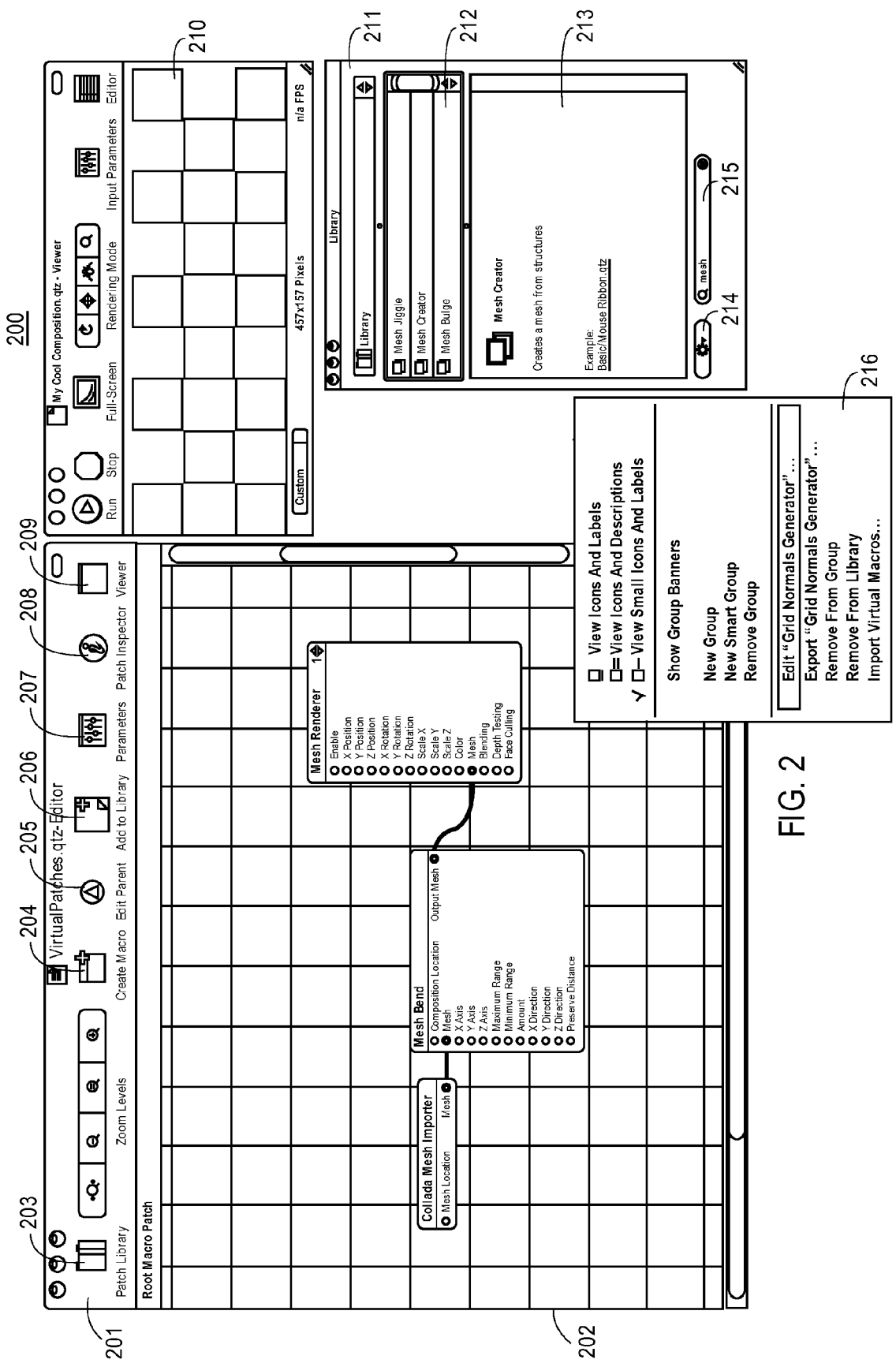
FIG. 2 is a screenshot illustrating a graphical user interface of a graphics development framework according to some embodiments.

FIG. 2 is a screenshot illustrating a graphical user interface of a graphics development framework according to some embodiments. For example, GUI 200 may be implemented as part of GUI 101 of FIG. 1. Specifically, GUI 200 may be part of editor 104 of FIG. 1. Referring to FIG. 2, GUI 200 includes a toolbar 201 and an editing window 202. Toolbar 201 includes one or more buttons that can be used to manipulate graphical representations representing patches displayed in the editing window 202. In one embodiment, toolbar 201 includes, but is not limited to, a patch library button 203, a create macro button 204, an edit parent button 205, an add-to-library button 206, a parameter button 207, a patch inspector button 208, and a viewer button 209.

Within editing window 202, patches can be visually connected together via one or more links to create a composition which essentially defines the data flow or the manner in which graphical motion data is processed by the composition.

Patch library button 203 when activated, displays a list of libraries of patches previously created, for example, as shown in window 211. From the displayed libraries, a user can select and open a library to select a patch to be included in a current project currently edited in the editing window 202. In this example, there are three patches which are selected and placed (e.g., drag-n-drop) from one or more libraries displayed, for example, from window 211.

Each of the displayed patches can be selected (e.g., highlighted) and its parameters or configuration can be edited. For example, a user can select a patch and activate the inspector button 208 to display a set of configurable parameters or attributes that can be modified, which may change the characteristics and/or behavior of the selected patch. This button may act on many selected patches at once, and the parameters for each are concatenated along the right hand side of the workspace window. Inspector button 208 is also used to edit parameters but is different by opening a separate utility window for editing called the Inspector (not shown). The Inspector panel invoked by button 208 then has room for static settings in the patch or editing source code if the patch is a code based patch. Only one patch may be selected at a time for editing in the Inspector.

Viewer button 209 can be used to display a viewing window 210 that instantly displays a rendering result of the patches currently being edited in editing window 202. As described above, a patch may include another patch as a child patch. Similarly, a patch may be a child of another patch (e.g., parent patch). Button 205 is used to display and edit a parent patch of a selected patch currently displayed in the editing window 202. By hiding the parent and/or child patches, a user can focus on the patches that are currently being edited without the distraction from other remote patches.

As described above, one or more patches can be selectively exported or shared with another user. According to one embodiment, button 204 may be used to create a virtual macro based on the selected patches. When a user activates button 204, GUI 200 may prompt the user to allow the user to enter the name for the macro being created, including a copyright statement and/or a brief description for the macro. In effect, patches are selected and merged into a macro patch and can be saved as a composition file, which can be shared with another user.

In addition, a dependency analysis is performed to determine any patches related to the selected patches, including any parent or child patches. Furthermore, the source code associated with selected patches and their related patches is extracted. The source code is extracted only for the selected patches and their related patches (e.g., having a dependency relationship with the selected patches), without the source code of any unrelated patches. The exported composition file may include the entire extracted source code or alternatively, a portion of the extracted source with references or links to external source code (e.g., commonly provided source code or primitives).

As a result, the exported composition file can be shared with another user. When the exported composition is installed and loaded in another system (e.g., imported), the system automatically checks whether a similar composition or patch exists in the system. For example, if a composition having the same identifier has already been installed in the system, the system may compare which one has a newer version. If the one being installed has a newer version, the user may be prompted to indicate whether the user would like to update the existing one (e.g., stored or installed in the local system). If so, the existing composition file or some of the patches referenced therein may be replaced by the imported ones.

Referring back to FIG. 2, once a macro patch has been created, the existing patches may be replaced by the newly created macro patch, encapsulating functionality of selected patches. Window 211 can be displayed by activating patch library button 203. Library window 211 includes a first window 212 listing certain libraries available for selection. When a library is selected from window 212, certain metadata or attributes associated with the selected library is displayed in a second window 213, such as, for example, copyright statements and description, etc. Such information may be entered when the library is created, for example, using button 206. Further actions available for the selected library can be displayed by activating button 214, which displays a list of possible actions as shown in window 216, including importing and exporting the selected library. Field 215 can be used to search a particular library or libraries available in the system.

According to one embodiment, patches for designing physics-based user interface composition representing a graphical object of the physics-based user interface can be edited within the editing window 202. A feedback patch can be used to provide a feedback loop from an output of the composition to an input of the composition, such that a subsequent behavior of a graphical object can be manipulated based on a previous behavior of the graphical object. For example, certain parameters of a next action of a graphical object may be adjusted based on parameters of a previous action of the graphical object. Such manipulation can be specified using certain patches (e.g., bouncy path) and a feedback patch, without requiring programming knowledge from a user of the graphics development framework.

Note that throughout this application, for the purpose of illustration, a button is utilized as an example of a user interface to receive a user input. However, it is not so limited. Other types of user interfaces, such as pulled-down or popped-up menus, as well as voice interactive commands may also be applied.

Figures 3A, 3B:
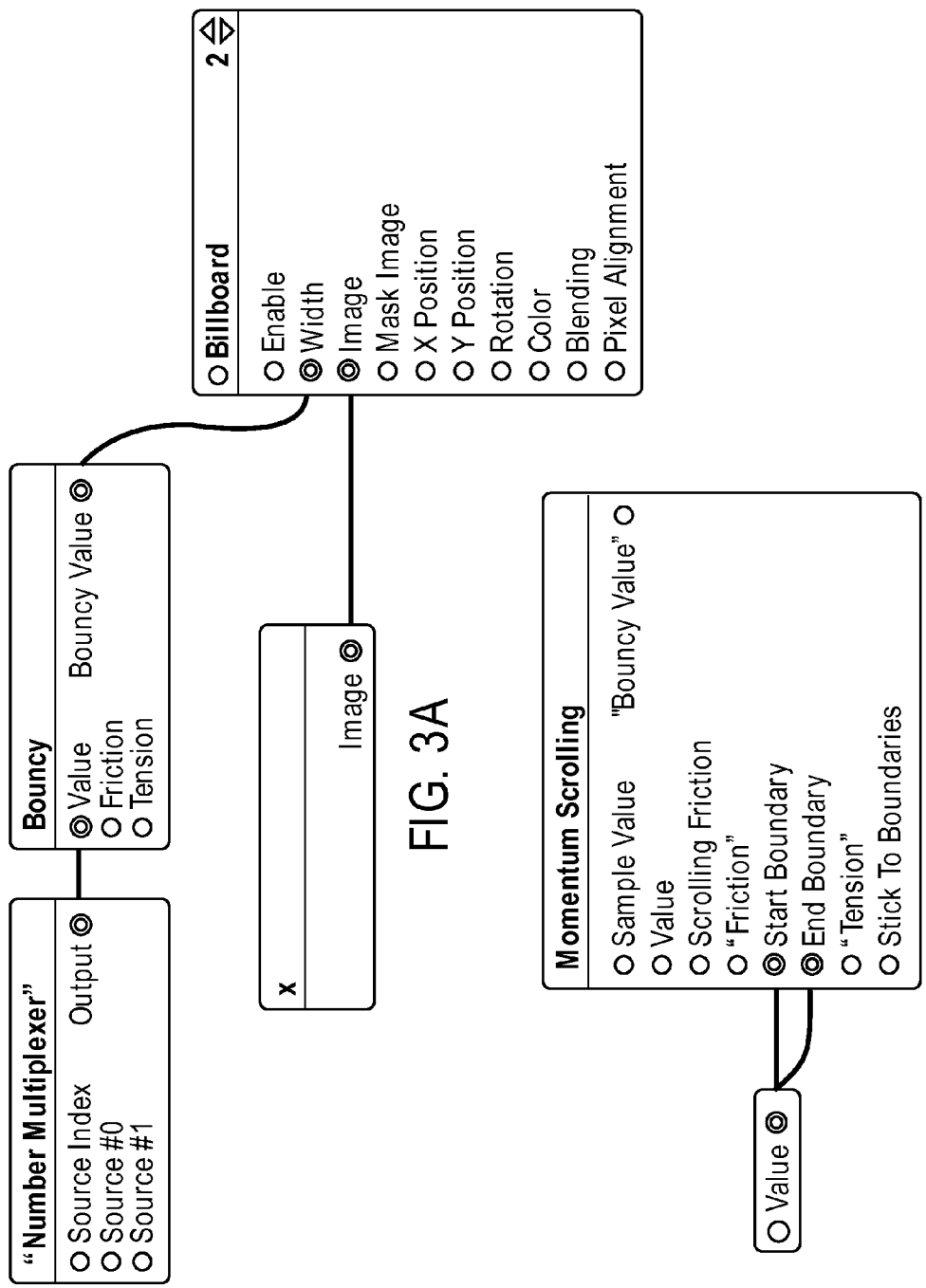
FIGS. 3A-3F are screenshots illustrating a process for designing a physics-based user interface using a graphics development framework according to one embodiment.

FIGS. 3A-3F are screenshots illustrating a process for designing a physics-based user interface using a graphics development framework according to one embodiment. Referring to FIG. 3A, in this example, a bouncy patch is utilized as an example of a physics-based user interface. A bouncy patch is generally used to add a rubberband or bouncy behavior to a value when changing between two states. For example, if we have an image which at S0 (state 0): Scale=0 and at S1 (state 1): Scale=1. If we do not interpolate these values then the image will discontinuously appear at Scale=1 when we change to S1. Core animation adds the ability to implicitly interpolate between values when changing states. This is generally done with a smooth interpolation which allows for continuous value changes between states. This would manifest as the image growing in size and resting on the final size when we change from S0 to S1. The bouncy patch extends this concept by adding implicit, physically based, animation to a given parameter. So when changing from S0 to S1, the image will grow at an accelerating rate, grow beyond the final specified Scale=1, slow down (Scale=1.2) and reverse, bouncing around the end goal of Scale=1 until finally resting on Scale 1.

In this example, the bouncy patch includes three input parameters: "value", "friction", and "tension", and an output "bouncy value." Input parameter "value" may be used to set an initial or default value upon which the output bouncy value is determined. In addition, the physical behavior of the bounce of a corresponding graphical object can be further specified by specifying "friction" and "tension" input parameters. Such parameters can be used to determine a behavior of a next or subsequent bounce following a previous bounce in view of the bounce friction and tension parameters. Note that, a user does not need to know how these parameters are used (e.g., programmed) to determine the behavior of the bounces. Rather, the user can simply specify these parameters and instantly monitor the instant result of the rendering via the viewing window (e.g., viewing window 210 of FIG. 2).

In this example, the bouncy patch as shown in FIG. 3A includes a momentum scrolling patch as shown in FIG. 3B, which is leveraged to create a spring effect by setting the start and end boundaries as input parameters of the momentum scrolling patch. In this example, patch as shown in FIG. 3A is a parent patch of FIG. 3B. Referring to FIG. 3B, Sample Value passes an input value through to an output value. Scrolling friction is the spring's coefficients of friction. Stick to Boundaries will force the value to stick to the edge of a range such that when it passes the range and bounces back it doesn't keep going, but instead "sticks" to the boundary and eventually settles on the boundary. This is essential for implicit state based animation as described above. Note that if ports are not connected, they can be manually set by double clicking them, or via an inspector. The "value" patch is a no-op patch, which is referred to as a value splitter. It allows a single value to be routed to multiple locations.

Figure 3C:
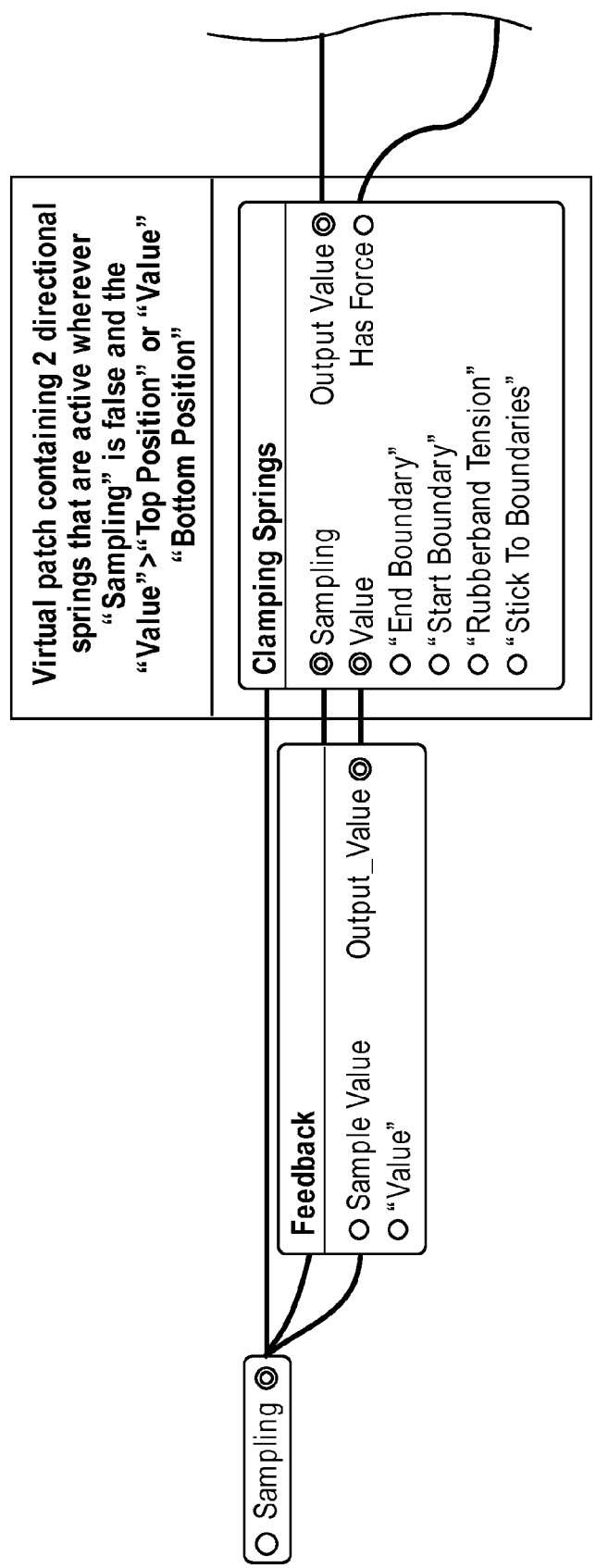
Figure 3C:
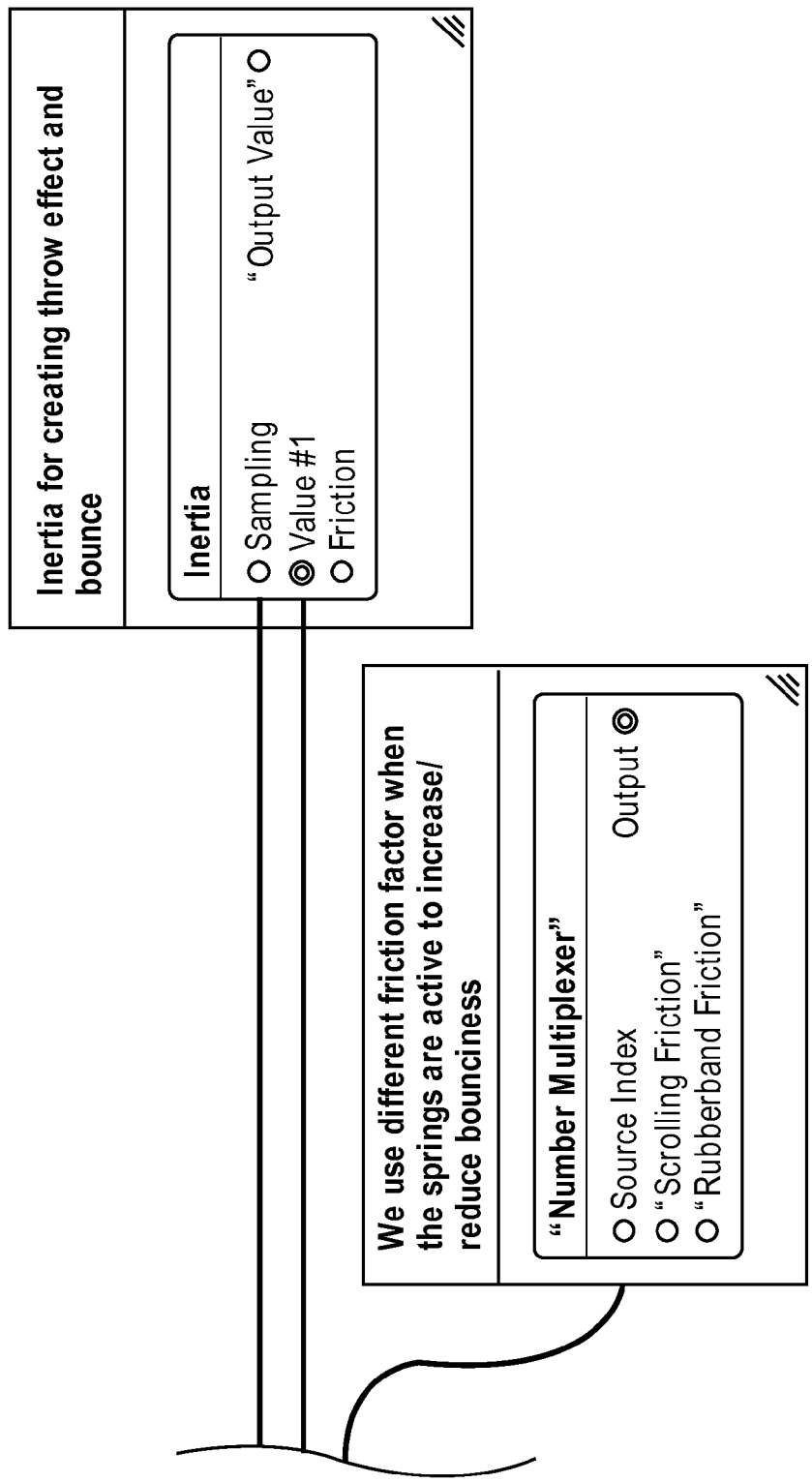

The momentum scrolling patch includes the main feedback loop using a feedback patch as shown in FIG. 3C. Referring to FIG. 3C, the composition includes a "clamping springs" patch disposed on the input and an "inertia" patch disposed on the output. In addition, a "feedback" patch is provided to connect an output of the "inertia" patch to an input of the "clamping springs" patch.

The output of "inertia" patch is provided via the feedback patch. The "feedback" patch provides values which are published within a given level of the hierarchical graph to patches within the same level. As described above, a composition can be constructed in hierarchical graphs having multiple levels. Each level within this hierarchy can have published inputs and outputs which are then exposed at a level above. These exposed ports form an interface for a given level. A feedback patch dynamically creates initial state input and output ports for all published ports at a given level in the hierarchy representing the values of the published output ports at a shifted time (e.g., t−dt). The patch automatically creates these outputs as well as corresponding inputs used to set initial values. Initial values are passed through when "sample value" is set to true and when the time is zero (e.g., initial time). When a spring at the edge of the boundaries is active, "has force" will be true and "rubberband friction" will be made available to the "inertia" patch instead of "scrolling friction." "Has force" is an output of the Spring composition which is set to true if the result of the spring equation (−K*(y−1)*Force Multiplier) is not zero.

The executable code for a native inertia patch basically integrates the following:

$$\text{speed} = \max(1 - dt * \text{frictionScale} * \text{friction}, 0) * \text{input}/dt$$

which represents a speed parameter of a next bounce. Here the speed of the next bounce is determined based on the scaled friction and the position of the previous bounce, etc.

Figure 3D:
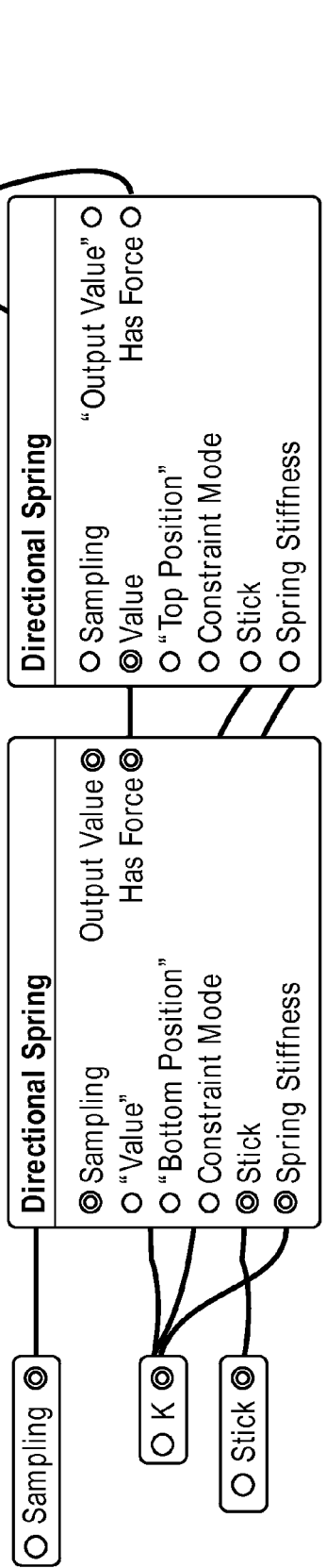
Figure 3E:
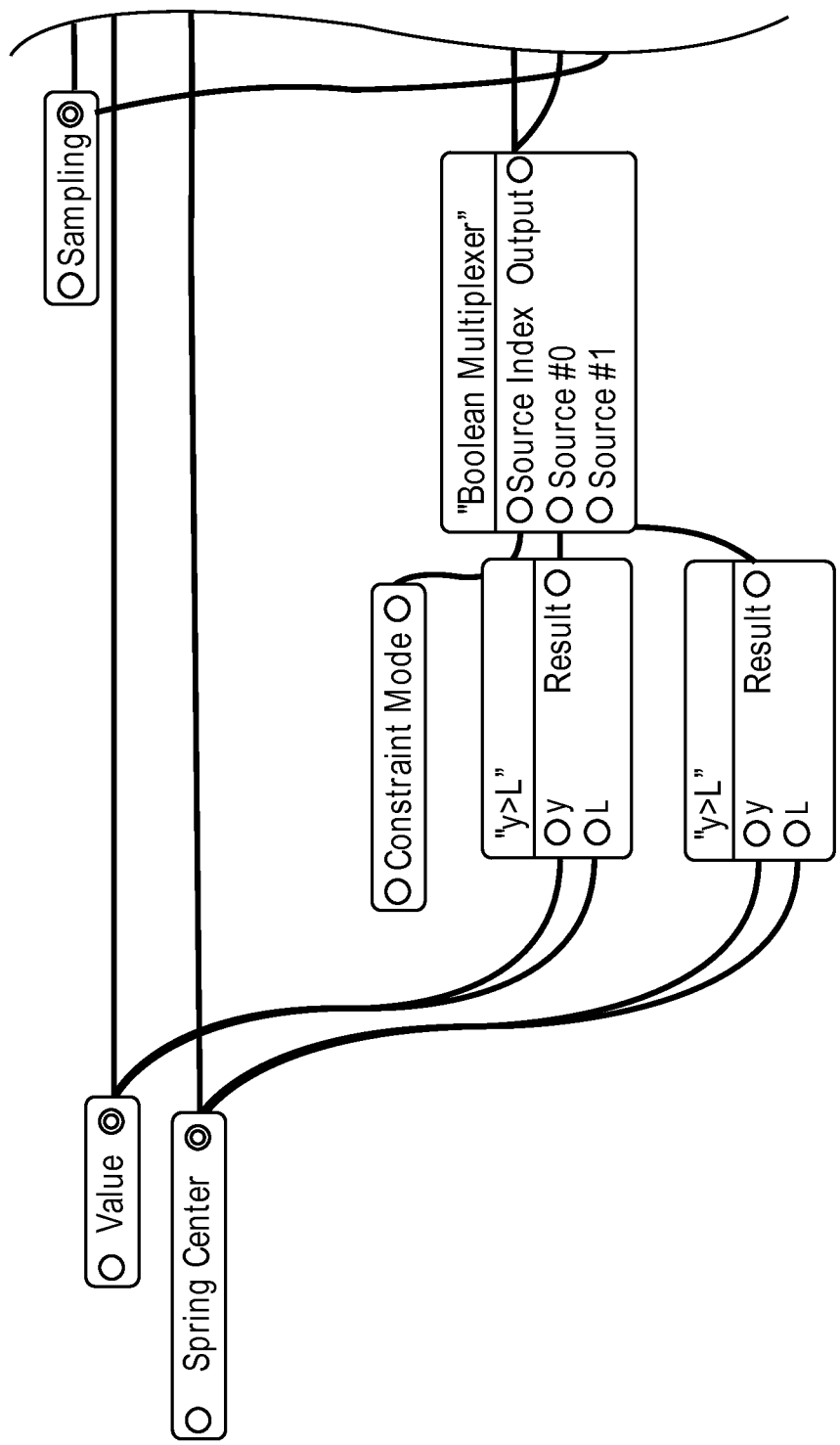
Figure 3E:
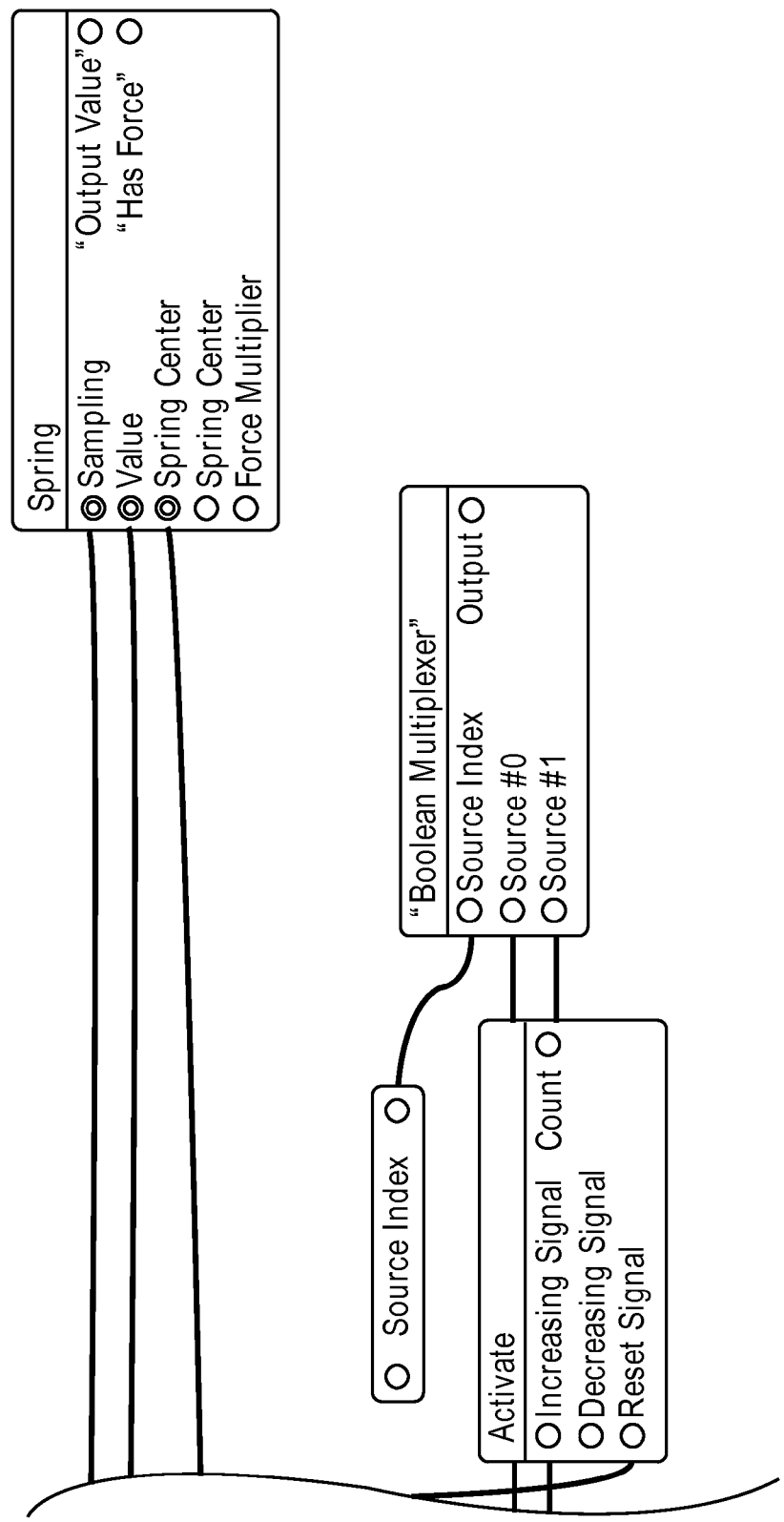

The "clamping springs" patch further includes two "directional spring" patches as shown in FIG. 3D. Each "directional spring" patch includes a basic "spring" patch, as well as other associated patches as shown in FIG. 3E. The "spring" patch is applied when the "value" input parameter passes (e.g., greater than) the value specified at "spring center" input parameter.

Figure 3F:
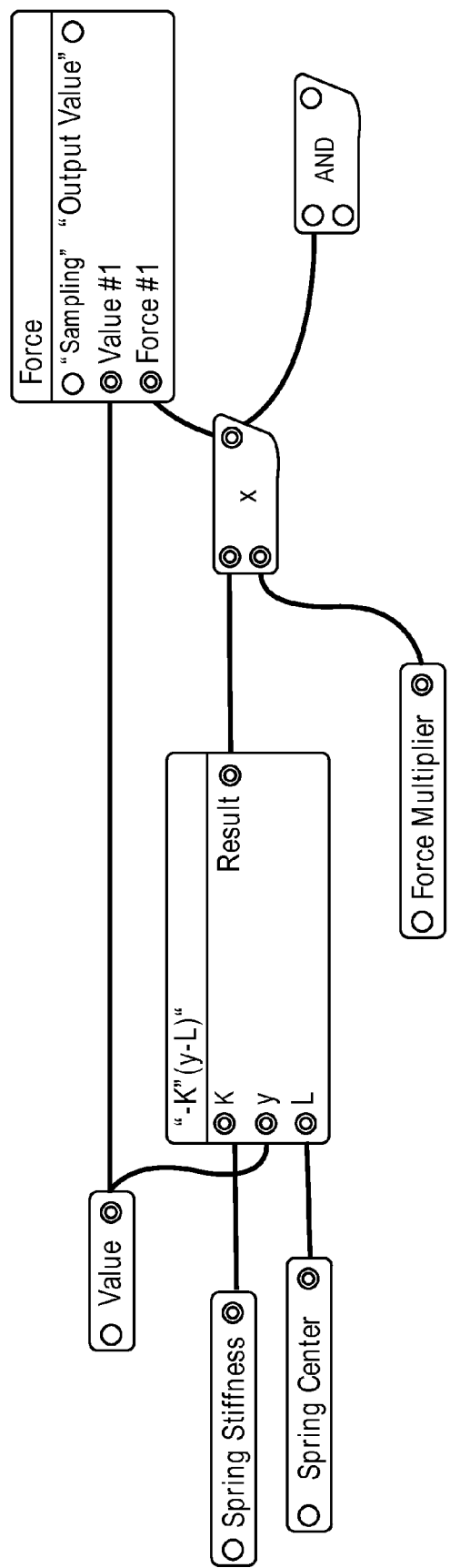

The basic "spring" patch includes a native "force" patch and a spring equation patch representing an equation of −K*(y−L), as shown in FIG. 3F. The output of the spring equation patch is fed into an input of the native "force" patch. The native "force" patch is configured to apply the specified force to a value when not sampling which allows for interaction (e.g., "sampling" is set to true when the mouse is clicked). In one embodiment, the "force" patch encapsulates pseudo code represented as follows:

```
If (sampling)
    OutputValue = InputValue;
Else
    OutputValue = Value + Force * dt * dt;
```

Note that the above algorithm represents a simple approximate integration operation only; more accurate integration methods may also be applied herein.

According to one embodiment, in order to generate stable or accurate values, data over a period of time may be collected to calculate the final output. For example, if there are some patches that are applied to inertia (affects speed) such as springs or attractors (e.g., forces, each affecting acceleration), one may need to at some point to gather all the data to compute an updated position, speed and acceleration to be stable over a period of time. Some previous values of position, acceleration and speed may be maintained, using a numerical differentiation schemas and dissipate some energy for stability. In one embodiment, the following schema is utilized:

$$\begin{aligned}\text{speed}(t) = &\ (\text{new\_position}(t)-\text{position}(t-dt) + \\ &\ \text{position}(t-dt)-\text{position}(t-2{*}dt)) / (2{*}dt) \\ \sim = &\ ((\text{position}(t)-\text{position}(t-dt))/dt + \text{speed}(t-dt))/2\end{aligned}$$

where new_position(t) is the potential position to be computed as a result of all the inertia, springs, attractors patches. Thereafter, the position is further fine tuned:

$$\text{position}(t) = \text{position}(t-dt) + dt{*}\text{speed}(t)$$

The above computation happens in the feedback patch that will output proper position(t) for the next time step. In the above equation, (position(t)−position(t−dt))/dt represents the numerical differentiation and the average (division by 2) the energy dissipation. One could imagine adjusting that coefficient, e.g. speed(t)=((position(t)−position(t−dt))/dt*(1.0−alpha)+speed(t−dt)*alpha, where alpha <0.5 for less dissipation. Other schemes may also be utilized.

Figure 4:
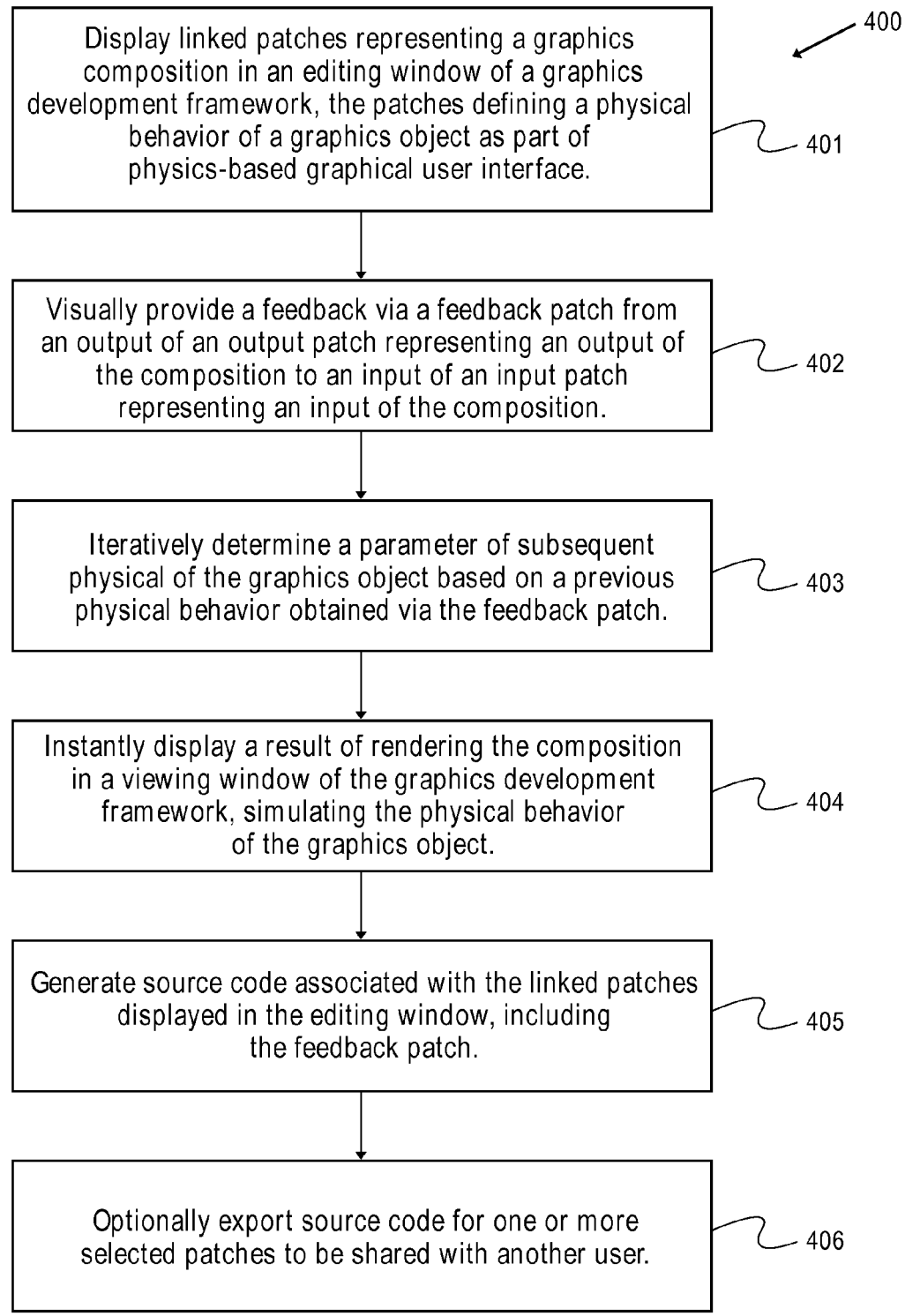
FIG. 4 is a flow diagram illustrating a method for designing physics-based user interface using a graphics development framework according to one embodiment of the invention.

FIG. 4 is a flow diagram illustrating a method for designing physics-based user interface using a graphics development framework according to one embodiment of the invention. Note that method 400 may be performed by processing logic which may include software, hardware, or a combination there of. For example, method 400 may be performed by the system as shown in FIG. 1. Referring to FIG. 4, at block 401, linked patches representing a composition are displayed in an editing window of a graphics development framework. The patches define certain physical behaviors of a graphics object as part of a physics-based user interface.

At block 402, a feedback patch is used to visually provide a feedback from an output of an output patch representing an output of the composition to an input of an input patch representing an input of the composition. At block 403, processing logic iteratively determines one or more parameters of a subsequent behavior of the graphics object based on a previous physical behavior obtained via the feedback patch. At block 404, processing logic instantly displays a rendering result of the graphics object in a viewing window of the graphics development framework, simulating the physical behavior of the graphics object. At block 405, source code associated with the linked patches including the feedback patch is generated and at block 406, certain selected patches and their associated source code may be exported and shared with another user. Other operations may also be performed.

As described above, patches or functional blocks used in conjunction with the graphics development framework provide an abstract layer for developing physics-based graphical user interfaces. Each patch or functional block can be visually connected or linked with another patch by a user and each patch or functional block encapsulates functionality of a particular function or subroutine for a specific operation. Each patch provides at least one input interface (also referred to as a port) and at least one output interface, which represent at least one underlying application programming interface at a source code programming level. As a result, a user could be an ordinary artist without having the programming knowledge as a particular software developer or programmer.

Example underlying application programming interfaces may implement scrolling, gesturing, and animating operations for a device having a display region. A display region is a form of a window. A window is a display region which may not have a border and may be the entire display region or area of a display. In some embodiments, a display region may have at least one window and/or at least one view (e.g., web, text, or image content). A window may have at least one view. The methods, systems, and apparatuses disclosed can be implemented with display regions, windows, and/or views.

A physics-based user interface may include scrolling operations for scrolling a display of a device. The scrolling operations include bouncing a scrolled region in an opposite direction of a scroll when a scroll completes, rubberbanding a scrolled region by a predetermined maximum displacement when the scrolled region exceeds a display edge, and setting a scrolling angle that locks the scroll in a horizontal or vertical direction.

The scrolling operations may include attaching scroll indicators to a content edge of a display. Alternatively, the scroll indicators can be attached to the display edge. A user input in the form of a mouse/finger down causes the scroll indicators to be displayed on the display edge, content edge, or window edge of the scrolled region. If a mouse/finger up is then detected, the scroll indicators are faded out from the display region, content edge, or window edge of the scrolled region.

A physics-based user interface may further include gesture operations for a display of a device. The gesture operations include performing a scaling transform such as a zoom in or zoom out in response to a user input having two or more input points. The gesture operations also include performing a rotation transform to rotate an image or view in response to a user input having two or more input points.

The gesture operations may include responding to at least one gesture call, if issued, by rotating a view associated with the event object based on receiving a plurality of input points in the form of the user input. Gesture operations may also include scaling a view associated with the event object by zooming in or zooming out based on receiving the user input.

Further detailed information regarding the underlying application programming interfaces for designing physics-based user interfaces can be found in a co-pending U.S. Published Application No. 20080168384 assigned to a common assignee of the present application, which is incorporated by reference herein in its entirety.

According to some embodiments, the techniques described throughout this application may be applied to a user interface of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. Media stored on a remote storage device may be transmitted to the media player through the RF transceiver. The media may be, for example, one or more of music or other audio, still pictures, or motion pictures.

A portable media player may include a media selection device, such as a click wheel input device on an iPod™ or iPod Nano™ media player from Apple Inc. of Cupertino, Calif., a touch screen input device, pushbutton device, movable pointing input device or other input device. The media selection device may be used to select the media stored on the storage device and/or the remote storage device. The portable media player may, in at least some embodiments, include a display device which is coupled to the media processing system to display titles or other indicators of media being selected through the input device and being presented, either through a speaker or earphone(s), or on the display device, or on both display device and a speaker or earphone(s). In one embodiment, the display device and input device are integrated while in other embodiments the display device and input device are separate devices.

According to some embodiments, the techniques described throughout this application may also be applied to a user interface of other types of data processing systems, such as, for example, entertainment systems or personal digital assistants (PDAs), or general purpose computer systems, or special purpose computer systems, or an embedded device within another device, or cellular telephones which do not include media players, or multi touch tablet devices, or other multi touch devices, or devices which combine aspects or functions of these devices (e.g., a media player, such as an iPod™, combined with a PDA, an entertainment system, and a cellular telephone in one device). Other configurations may also be applied.

Figure 5:
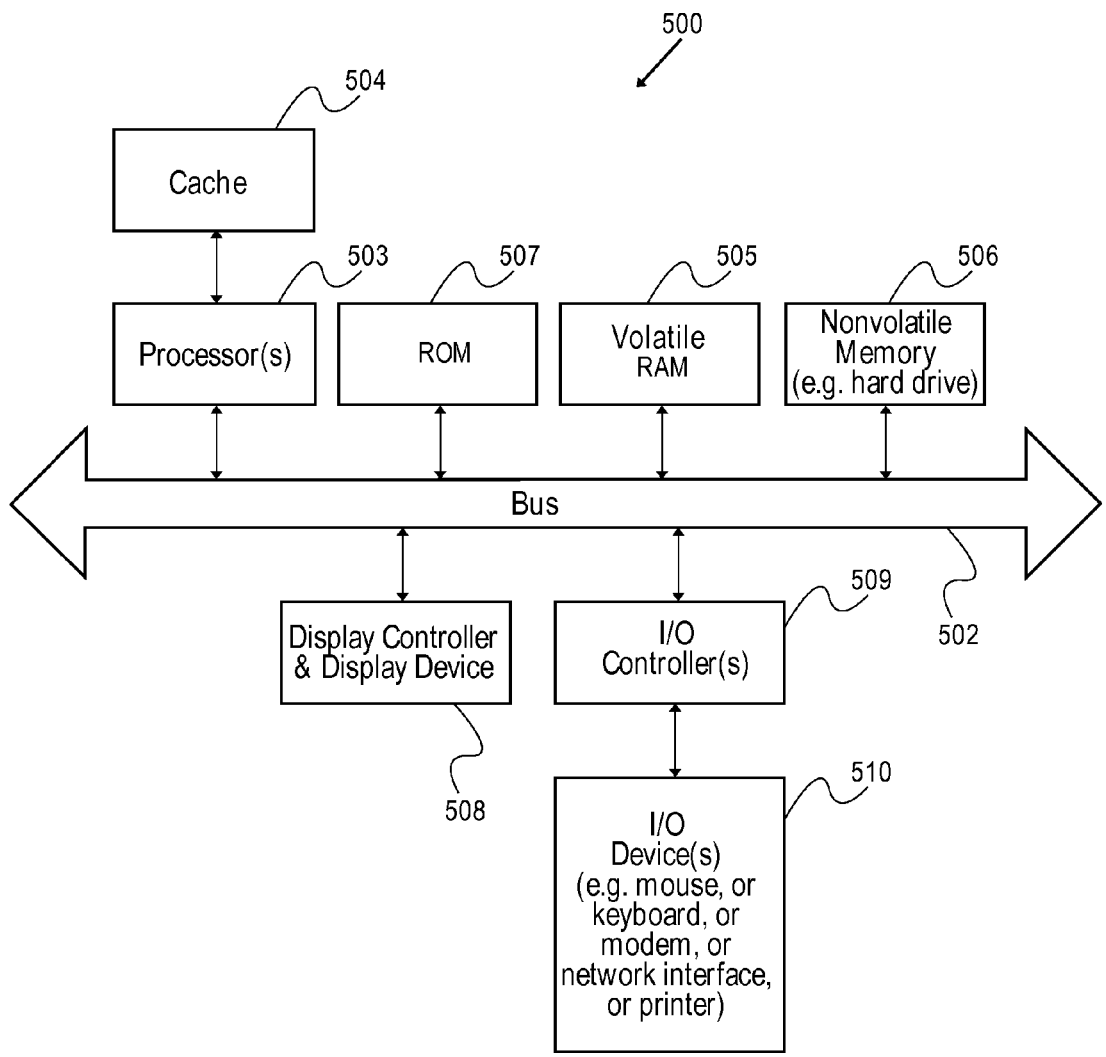
FIG. 5 is a block diagram of a data processing system, which may be used with one embodiment of the invention.

FIG. 5 is a block diagram of a data processing system, which may be used with one embodiment of the invention. For example, the system 500 shown in FIG. 5 may be used as systems 100 of FIG. 1. Note that FIG. 5 illustrates a diagrammatic representation of a machine in the exemplary form of a computer system 500 within which a set of instructions, for causing the machine to perform any one or more of the methodologies discussed herein, may be executed. In some embodiments, the machine may be connected (e.g., networked) to other machines in a local area network, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

As shown in FIG. 5, the computer system 500, which is a form of a data processing system, includes a bus or interconnect 502 which is coupled to one or more processors 503 and a ROM 507, a volatile RAM 505, and a non-volatile memory 506. The processor 503 is coupled to cache memory 504. The bus 502 interconnects these various components together and also interconnects these components 503, 507, 505, and 506 to a display controller and display device 508, as well as to input/output (I/O) devices 510, which may be mice, keyboards, modems, network interfaces, printers, and other devices which are well-known in the art.

Processor 503, also referred to as a processing device, represents one or more general-purpose processing devices such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), network processor, or the like. The processor is configured to execute instructions for performing the operations and steps discussed herein.

Typically, the input/output devices 510 are coupled to the system through input/output controllers 509. The volatile RAM 505 is typically implemented as dynamic RAM (DRAM) which requires power continuously in order to refresh or maintain the data in the memory. The non-volatile memory 506 is typically a magnetic hard drive, a magnetic optical drive, an optical drive, or a DVD RAM or other type of memory system which maintains data even after power is removed from the system. Typically, the non-volatile memory will also be a random access memory, although this is not required.

These memories are collectively referred to as a machine-readable medium on which is stored one or more sets of instructions or software embodying any one or more of the methodologies or functions described herein. The software may also reside, completely or at least partially, within the main memory and/or within the processor during execution thereof by the computer system, the main memory and the processor also constituting machine-accessible storage media. The software may further be transmitted or received over a network via a network interface device.

While FIG. 5 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals. Alternatively, I/O controller 509 may include an IEEE-1394 adapter, also known as FireWire adapter, for controlling FireWire devices.

Thus, a graphics development framework for designing physics-based graphical user interfaces has been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method, comprising:
    displaying a plurality of visually linked patches in an editing window of a graphics development framework, the patches representing a graphics composition as a part of a physics-based graphical user interface (GUI) which when rendered, animates a physical behavior of a graphics object of the physics-based GUI;
    displaying within the editing window a feedback patch to visually provide a feedback from an output of the composition to an input of the composition, such that a subsequent physical movement of the graphics object is determined based on a previous physical movement of the graphics object, wherein the feedback patch includes an input coupled to the output of the composition and an output coupled to the input of the composition;
    in response to a selection of the feedback patch from the editing window of the graphics development framework, displaying an inspection window associated with the selected feedback patch, the inspection window being separated from the editing window;
    receiving one or more parameters of the feedback patch specified by a user via one or more fields displayed within the inspection window;
    calculating, using an algorithm associated with the feedback patch based on the parameters received via the inspection window, one or more parameters that have an impact on the subsequent physical movement of the graphics object based on the output of the composition in view of the received one or more parameters of the feedback patch, wherein the feedback path dynamically creates a value to be fed into the input of the composite representing the output of the composite at a shifted time, wherein the subsequent physical movement of the graphics object includes at least one of spring effect, inertia effect, attractor effect, and bounce effect that is adjusted based on the calculation in view of the received one or more parameters of the feedback patch; and
    instantly rendering and displaying a result of rendering in a viewing window of the graphics development framework, simulating the physical behavior of the graphical object.

2. The method of claim 1, wherein an output of the feedback patch is visually connected to an input of a patch representing the input of the composition, wherein the output of the feedback patch represents the output of the composition.

3. The method of claim 2, further comprising setting an identifier of the output of the feedback patch to match an identifier of the output of a patch representing the output of the composition, in order for the feedback patch to represent the output of the composition.

4. The method of claim 1, wherein the physical movement of the graphics object includes a bouncing movement, and wherein calculating one or more parameters includes determining a friction parameter of a subsequent bounce of the graphics object based on a previous bounce received via the feedback patch and the one or more parameters received via the inspection window of the feedback patch.

5. The method of claim 4, wherein the friction parameter includes at least one of a scrolling friction parameter and a rubberband friction parameter.

6. A non-transitory machine-readable medium having instructions stored therein, which when executed by a machine, cause the machine to perform a method, the method comprising:
    displaying a plurality of visually linked patches in an editing window of a graphics development framework, the patches representing a graphics composition as a part of a physics-based graphical user interface (GUI) which when rendered, animates a physical movement of a graphics object of the physics-based GUI;
    displaying within the editing window a feedback patch to visually provide a feedback from an output of the composition to an input of the composition, such that a subsequent physical movement of the graphics object is determined based on a previous physical movement of the graphics object, wherein the feedback patch includes an input coupled to the output of the composition and an output coupled to the input of the composition;
    in response to a selection of the feedback patch from the editing window of the graphics development framework, displaying an inspection window associated with the selected feedback patch, the inspection window being separated from the editing window;
    receiving one or more parameters of the feedback patch specified by a user via one or more fields displayed within the inspection window;
    calculating, using an algorithm associated with the feedback patch based on the parameters received via the inspection window, one or more parameters that have an impact on the subsequent physical movement of the graphics object based on the output of the composition in view of the received one or more parameters of the feedback patch, wherein the feedback path dynamically creates a value to be fed into the input of the composite representing the output of the composite at a shifted time, wherein the subsequent physical movement of the graphics object includes at least one of spring effect, inertia effect, attractor effect, and bounce effect that is adjusted based on the calculation in view of the received one or more parameters of the feedback patch; and
    instantly rendering and displaying a result of rendering in a viewing window of the graphics development framework, simulating the physical movement of the graphical object.

7. The non-transitory machine-readable medium of claim 6, wherein an output of the feedback patch is visually connected to an input of a patch representing the input of the composition, wherein the output of the feedback patch represents the output of the composition.

8. The non-transitory machine-readable medium of claim 7, wherein the method further comprises setting an identifier of the output of the feedback patch to match an identifier of the output of a patch representing the output of the composition, in order for the feedback patch to represent the output of the composition.

9. The non-transitory machine-readable medium of claim 6, wherein the physical movement of the graphics object includes a bouncing movement, and wherein calculating one or more parameters includes determining a friction parameter of a subsequent bounce of the graphics object based on a previous bounce received via the feedback patch and the one or more parameters received via the inspection window of the feedback patch.

10. The non-transitory machine-readable medium of claim 9, wherein the friction parameter includes at least one of a scrolling friction parameter and a rubberband friction parameter.

11. A data processing system, comprising:
   a display device;
   a processor; and
   a memory for storing instructions therein, which when executed from the memory, cause the processor to
      display on the display device a plurality of visually linked patches in a first window of a graphics development framework, the patches representing a graphics composition as a part of a physics-based graphical user interface (GUI) which when rendered, animates a physical movement of a graphics object of the physics-based GUI,
      display on the display device a feedback patch to visually provide a feedback from an output of the composition to an input of the composition, such that a subsequent physical movement of the graphics object is determined based on a previous physical movement of the graphics object, wherein the feedback patch includes an input coupled to the output of the composition and an output coupled to the input of the composition,
      in response to a selection of the feedback patch from the editing window of the graphics development framework, display an inspection window associated with the selected feedback patch, the inspection window being separated from the editing window,
      receive one or more parameters of the feedback patch specified by a user via one or more fields displayed within the inspection window,
      calculate, using an algorithm associated with the feedback patch based on the parameters received via the inspection window, one or more parameters that have an impact on the subsequent physical movement of the graphics object based on the output of the composition in view of the received one or more parameters of the feedback patch, wherein the feedback path dynamically creates a value to be fed into the input of the composite representing the output of the composite at a shifted time, wherein the subsequent physical movement of the graphics object includes at least one of spring effect, inertia effect, attractor effect, and bounce effect that is adjusted based on the calculation in view of the received one or more parameters of the feedback patch, and
      instantly rendering and displaying on the display device a result of rendering in a second window of the graphics development framework, simulating the physical movement of the graphical object.

12. The system of claim 11, wherein an output of the feedback patch is visually connected to an input of a patch representing the input of the composition, wherein the output of the feedback patch represents the output of the composition.

13. The system of claim 12, wherein an identifier of the output of the feedback patch is set to match an identifier of the output of a patch representing the output of the composition, in order for the feedback patch to represent the output of the composition.

14. The system of claim 11, wherein the physical movement of the graphics object includes a bouncing movement, and wherein calculating one or more parameters includes determining a friction parameter of a subsequent bounce of the graphics object based on a previous bounce received via the feedback patch and the one or more parameters received via the inspection window of the feedback patch.

15. The system of claim 14, wherein the friction parameter includes at least one of a scrolling friction parameter and a rubberband friction parameter.

* * * * *